Oct. 21, 1969  A. J. CUSSEN ET AL  3,474,249
ABSOLUTE RADIATION CALORIMETER ARRANGEMENT
Filed Dec. 9, 1966  3 Sheets-Sheet 3
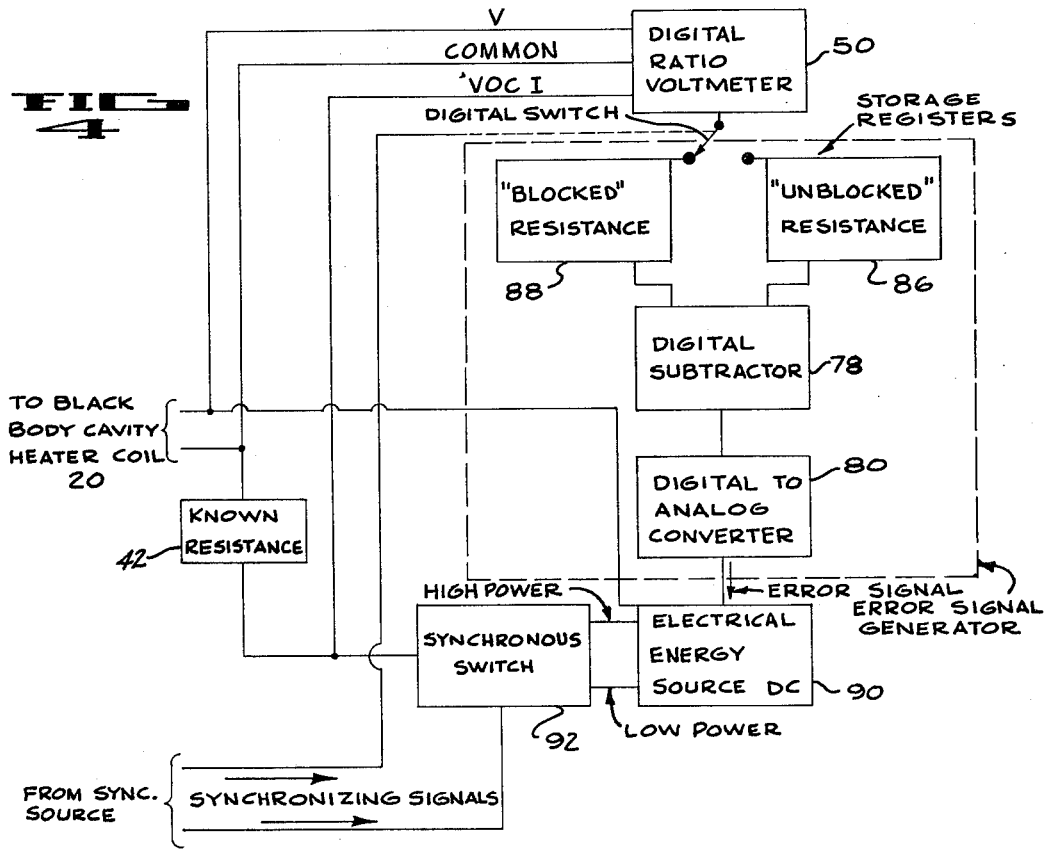
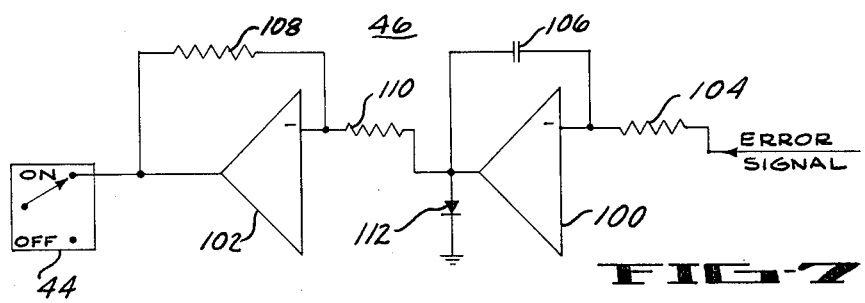
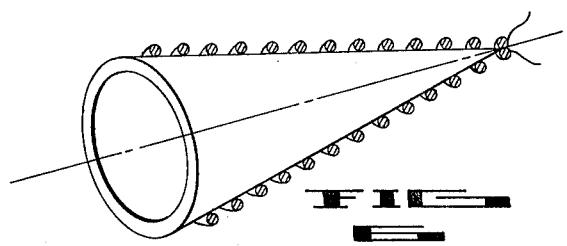
INVENTOR.
ROBERT E. CHANDOS
ARTHUR J. CUSSEN
BY
Lon Finkelstein
ATTORNEY United States Patent Office 3,474,249
Patented Oct. 21, 1969

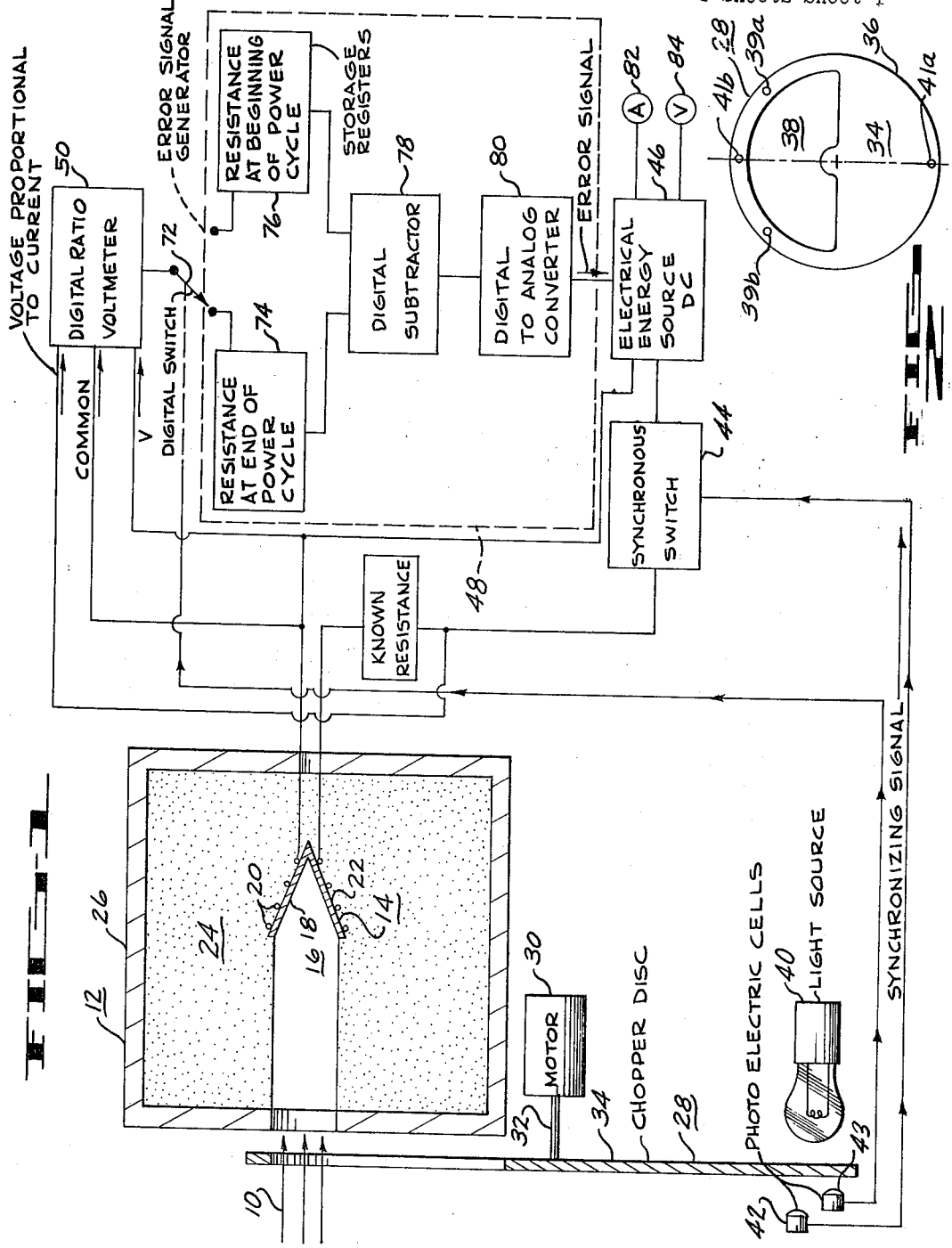

3,474,249
ABSOLUTE RADIATION CALORIMETER
ARRANGEMENT
Arthur John Cussen and Robert Eugene Chandos, Santa
Barbara, Calif., assignors to Electro-Optical Industries,
Inc., a corporation of California
Filed Dec. 9, 1966, Ser. No. 600,506
Int. Cl. G01t 1/16
U.S. Cl. 250—83.3                                7 Claims

ABSTRACT OF THE DISCLOSURE

There is disclosed herein an arrangement for measuring the intensity of incident electro-magnetic radiation. The accuracy and repeatability of the arrangement described is such that it may be utilized as a precision standard. The incident electro-magnetic radiation is received on a fast response black body cavity after passing through a chopper. The black body cavity is surrounded by a coil that is heated by electrical energy to heat the black body cavity. Measurement of the changes in the resistance of the coil at selected time periods provides a measurement of the temperature of the black body and this information is utilized to control the amount of electrical energy provided to the heating coil. Measurement of the amount of electrical energy supplied to the heating coil when it has stabilized provides a measurement of the intensity of the electro-magnetic radiation that is incident on the black body cavity.

---

This invention relates to the electromagnetic radiation art and more particularly to an improved arrangement for providing measurement of the intensity of incident radiant electromagnetic radiation.

In many applications it is often desirable to measure the intensity of incident electromagnetic radiation. One important application in which it is often very desirable to measure the intensity of incident electromagnetic radiation is in the indirect measurement of the temperature of radiating objects. To the best of applicant's knowledge, there does not now exist any precision standard for measurement of the radiation emitted from an object having temperatures in excess of approximately 1500 degrees centigrade.

In infrared radiation applications, it is necessary to utilize, during various manufacturing, testing and utilization procedures, both infrared radiation emitting devices and infrared radiation detection devices. For both such devices it is often necessary to be able to determine with a high degree of precision the exact intensity of electromagnetic radiation utilized in such infrared systems. For example, if an infrared detection system is to be fabricated, it is necessary, of course, to calibrate the response of the system as a function of the temperature of the object that is to be detected. Therefore, to determine the exact response, it is generally desirable to employ an infrared radiation emitter, preferably a standard emitter, that generates substantially black body electromagnetic radiation. However, such a standard should frequently be calibrated so that the precise relationship between intensity of the electromagnetic radiation emitted therefrom and the response of the infrared detection system may be determined.

Accordingly, it is an object of this invention to provide an improved arrangement for measuring the intensity of incident electromagnetic radiation.

It is another object of this invention to provide an improved precision standard for measuring the intensity of electromagnetic radiation.

It is yet another object of this invention to provide an infrared radiation intensity detection arrangement in which the measurement of the intensity of electromagnetic radiation may be rapidly and accurately made.

The above and other objects are achieved, according to one embodiment of this invention, by providing a low thermal mass fast response time black body cavity for receiving the radiant energy to be measured. The black body cavity is wound, in heat transfer relationship, in this embodiment of applicant's invention, on the external surfaces thereof with a fine platinum wire. The platinum wire in this invention serves a dual function. It is utilized in a temperature measuring function as part of the structure to measure the temperature of the black body cavity by determining the resistance of the wire, since the resistance of the platinum wire is a well-known function of the temperature thereof. Secondly, it is utilized as a means for applying electrical energy to the black body cavity to heat the black body cavity.

The platinum wire is in intimate heat transfer relationship contact with the low thermal mass conical black body cavity so that the temperature of the black body cavity and the temperature of the platinum wire are essentially the same at all times.

A chopper disc driven by a motor is located in front of the black body cavity to interrupt cyclically impingement of the incident radiant energy to be measured upon the black body cavity. A synchronizing signal that indicates when the radiant energy to be measured is blocked from impingement upon the black body cavity and when the radiant energy to be measured is incident thereon is also generated from the rotation of the chopper disc and this synchronizing signal is supplied to a synchronous switch on a source of electrical energy. The source of electrical energy is connected to the platinum wire surrounding the black body cavity through the synchronous switch.

Means are also provided for cyclically measuring the resistance of the platinum wire. The resistance measurements are fed into an error signal generator, and the error signal generator generates an error signal having a magnitude proportional to the difference between two successive measurements of the temperature of the black body cavity and a sign the same as the difference therebetween.

The error signal is supplied to the electrical energy source and controls the magnitude of the electrical energy supplied to the platinum wire so that the amount of electrical energy supplied to the black body cavity through the platinum wire is held constant for the condition of the temperature of the black body cavity the same when both the radiant energy is incident thereon and when it is blocked therefrom.

The black body cavity is thermally insulated so that substantially the only heat transferred to and from the black body cavity is by the absorption of the radiant energy to be measured, radiation emission therefrom, and the energy supplied from the electrical energy source. For a black body cavity in this environment the absorptivity equals the emissivity and therefore the amount of electrical energy supplied to the black body cavity during blocked time to maintain the temperature constant thereof is substantially identical to the energy of the incident radiaion to be measured that is incident on the black body cavity during the unblocked time.

The above and other embodiments of applicant's invention may be more fully understood from the following detailed description taken together with the accompanying drawings wherein similar reference characters refer to similar elements throughout and in which:

FIGURE 1 is a drawing, partially in block diagram form, of one embodiment of applicant's invention herein;

FIGURE 2 illustrates a chopper disc useful in the practice of applicant's invention herein;

Figure 5:
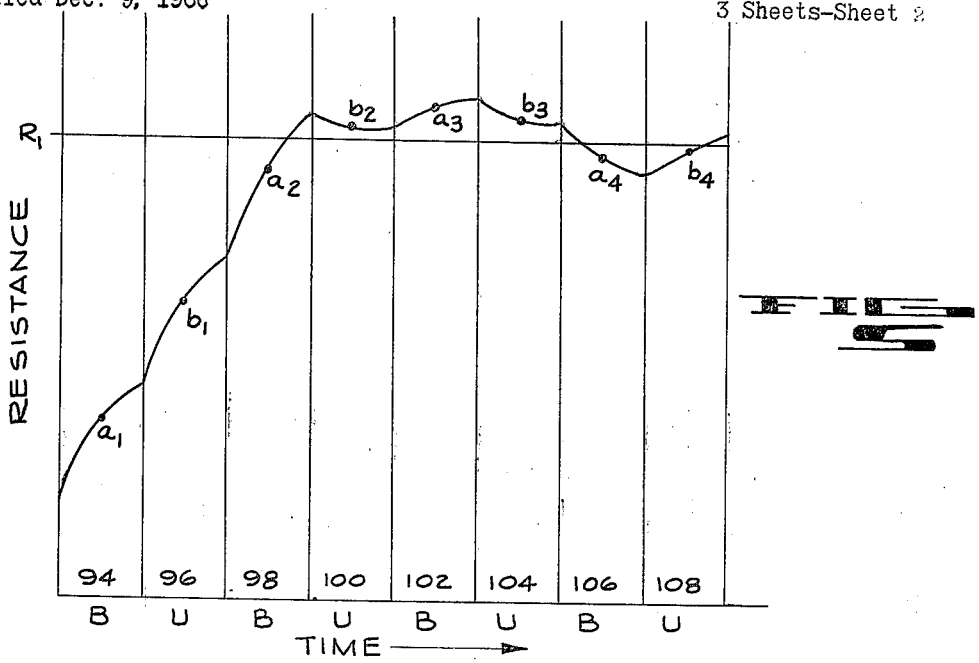
Figure 3:
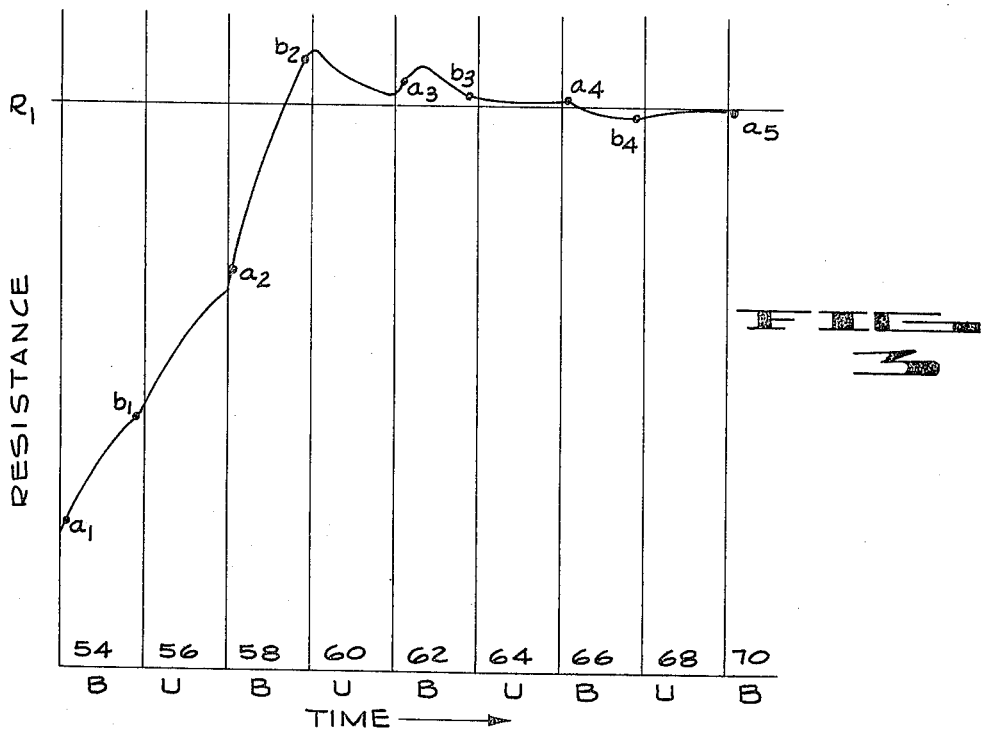

FIGURE 3 graphically illustrates the relationship between various perimeters associated with the operation of the embodiment of applicant's invention shown in FIGURE 1;

FIGURE 4 is a drawing, in block diagram form, of another embodiment of applicant's invention;

FIGURE 5 graphically illustrates operating parameters of the embodiment shown on FIGURE 4;

FIGURE 6 illustrates a black body cavity source useful in the practice of applicant's invention; and FIGURE 7 illustrates an electrical energy source useful herein.

Before detailing the discussion of applicant's invention herein, applicant wishes to point out that the structural materials and configurations illustrated herein are the best mode known to the applicant of taking advantage of his invention. However, such illustration and the specification of such structural details are not to be considered or construed as limiting to the invention.

In the following description of the preferred embodiments of applicant's invention, applicant discloses utilization of digital components. However, it will be appreciated the analog counterparts of such digital components could also be electrically utilized in the practice of applicant's invention.

Referring now to FIGURE 1, there is shown one embodiment of applicant's improved arrangement for measuring the intensity of incident electromagnetic radiation. As shown on FIGURE 1, electromagnetic radiation, generally designated by the arrows 10, is the electromagnetic radiation to be measured and the intensity of which is to be determined. The electromagnetic radiation 10 is incident upon black body 12 having a conical shell 14 defining a black body cavity 16 on the inner surfaces 18 thereof. An electrically conductive wire coil means such as a coil of platinum wire 20 is wound around the external surfaces 22 of the conical shell 14 in intimate heat transfer relationship thereto so that the temperature of the conical shell 14 is substantially always identical to the temperature of the wire means 20. The conical shell 14 and wire means 20 are surrounded by a thermally insulating material 24 to reduce conductive and/or convective heat transfer therefrom and the entire structure may be encased in a shell 26. The electromagnetic radiation 10 is directed to impinge upon the black body cavity 16 by being incident upon the inner surfaces 18 of the conical shell 15.

A chopper disc 28 driven by, for example, a motor means 30 in the direction indicated by the arrow 32, is utilized to cyclically interrupt the impingement of the incident electromagnetic radiation 10 on the black body cavity 16.

FIGURE 2 illustrates a chopper disc 28 useful in the practice of applicant's invention herein. As shown on FIGURE 2, the chopper disc 28 has essentially one blade, that is one opaque portion 36 and one section 38 that is open to allow the transmission of electromagnetic radiation therethrough. The surface 34 of the blade portion 36 of the chopper disc 28 facing the black body cavity 16 is preferably highly reflective so that electromagnetic radiation emitted from the black body cavity 16 is essentially all reflected back thereto from the highly reflective surface 34.

For the chopper disc 28 illustrated in FIGURE 2, it will be appreciated that for each revolution there is provided one complete cycle of impingement of the electromagnetic radiation 10 upon the black body cavity 16 and blocking of the electromagnetic radiation 10 from impingement upon the black body cavity 16. Since the time constant of the conical shell 14 and wire means 20 may be on the order of one-fifth of a second, that is, the response time of the conical shell means 14 and wire means 20 to change temperature in response to changes in the energy applied thereto, the motor 30 may rotate the chopper disc 28, at, for example, five revolutions per second.

Thus, in each second, there are five complete cycles of impingement and blocking of the incidental electromagnetic radiation 10 and the conical shell means 14 and wire means 20 can react to changes in the energy applied thereto during each cycle. It will be appreciated, of course, that for different response times of the conical shell 14 and wire means 20, different rotating speeds of the chopper disc 20 or different chopper disc configurations, that is, different numbers of blades and open spaces, may be provided as required for any particular structural arrangement.

Means are also provided for detecting the time periods when the electromagnetic radiation 10 is incident on the black body cavity 16 when it is blocked from impingement thereon. One such means useful in the practice of applicant's invention is a light source 40 on one side of the chopper disc 28, for example, on the black body 12 side, and a photoelectric cell 42 on the opposite side of the disc 28 and the light source 40 directed to irradiate the photoelectric cell 42 through the open space 38 during each revolution of the chopper disc 28.

For the particular chopper disc 28 illustrated in FIGURE 2 and utilized in this embodiment of applicant's invention, when the light emitted by the light source 40 is incident on the photoelectric cell 42 and a synchronizing signal in response thereto is generated therein, the electromagnetic radiation 10 is blocked from impingement on the black body cavity 16. When the radiation from the light source 40 is not incident on the photoelectric cell 40 but is blocked by the blade portion 34 of the disc 28, then no synchronizing signal is generated and the electromagnetic radiation 10 is incident on the black body cavity 16. Thus, the light source 40 and photoelectric cell 42 combine to provide a synchronizing signal that indicates when the electromagnetic radiation 10 is incident on the black body cavity 16 and when it is blocked from impingement thereon.

The synchronizing signal generated by the photoelectric cell controls a synchronous switch 44 that controls the output of an electrical energy source 46 in an "on-off" mode. That is, the synchronous switch 44 either allows electrical energy to flow from the electrical energy source 46 to the wire means 20 during one portion of each cycle provided by the chopper disc 28 and stops the electrical energy from being applied to the wire means 20 during another portion of each cycle provided by the chopper disc 28. In this embodiment of applicant's invention, the synchronous switch is adapted to allow electrical energy to flow from the source of electrical energy 46 to the wire means 20 during those portions of each cycle when the electromagnetic radiation 10 is blocked from impingement upon the black body cavity 16 and to terminate the flow of electrical energy from the electrical energy source 46 when the electromagnetic radiation 10 is incident upon the black body cavity 16. The magnitude of the electrical energy applied to the wire means 20 from the electrical energy source 46 is varied by an error signal applied thereto as described below in greater detail.

Applicant's invention herein periodically measures the temperature of the conical shell 14 during each cycle of blocked and unblocked times of the electromagnetic radiation 10 and in response to such temperature measurements an error signal generator 48 generates an error signal that is applied to the electrical energy source 46 and controls the magnitude of the electrical energy that is transmitted from the electrical energy source through the synchronous switch 44 to the coil means 20.

To achieve the measurement of the temperature of the black body cavity 16 the temperature of the conical shell 14 is measured. Measurement of the temperature of the conical shell 14 is achieved by measurement of the resistance of the wire means 20 since, for example, if platinum is utilized as the wire means 20, the resistance of platinum as a function of temperature is well-known. Thus, in the preferred embodiment of applicant's invention, as shown on FIGURE 6, the conical shell 14 is preferably a thin wall structure having a comparatively low thermal lag for variations in temperature due to changes in radiation incident thereon. Therefore, the response time of changes in the resistance of the wire means 20 will be comparative short so that a rapid response in changes in resistance will occur for variations in intensity of the incident electromagnetic radiation 10. Since, in this embodiment of applicant's invention, it is the intensity of the incident electromagnetic radiation 10 that is to be measured, the insulation 24 in the black body 12 minimizes heat gain or loss from the conical shell 14 by conduction and convection and tends to limit the heat transfer modes from the conical shell 14 to gains or losses by radiation.

The resistance of the wire means 20 is measured by applying the voltage generated by the electrical energy source 46 across the wire means 20 as shown on FIGURE 1 and the voltage drop across the wire means 20 is also fed into a digital ratio voltmeter 50. The current is applied through a known resistance 52 and then the voltage drop across this known resistance 52 is also fed into the digital ratio voltmeter. The known resistance 52 is in series with the resistance of the coil means 20 and the voltage drop across the known resistance provides a voltage signal having a magnitude proportional to the current flow in the system. The digital ratio voltmeter 50 takes the ratio of these two signals, that is the voltage generated by electrical energy source 46 and the voltage drop across the known resistance 52 that is in series with the coil means 20 and therefore provides a signal having a magnitude proportional to the resistance of the wire means 20. In the preferred embodiment of applicant's invention, as shown on FIGURE 1, there is no accuracy requirement necessitated for the resistance reading. Rather, the only requirement is that there be a comparison repeatability, that is there should be repeatability in the measurement of the resistance in detecting sequentially measured resistances that are greater than, less than or equal to the previous reading of resistance, as described more fully below. Therefore, since accuracy requirements on the resistance reading are not necessitated, applicant's improved absolute calorimeter can become and be utilized for a primary standard as desired.

The signal from the digital ratio voltmeter 50 is applied to the error signal generator 48. In the embodiment of applicant's invention shown on FIGURE 1, two measurements of the resistance of the wire means 20 are made during each cycle of blocked and unblocked time. In this embodiment, the measurements of the resistance of the wire means 20 are made at the beginning and at the end of the application of electrical energy from the electrical energy source 46 to the wire means 20. That is, the measurements are made at the beginning and the end of the blocked time of the electromagnetic radiation 10 when it is blocked from impingement on the black body cavity 16. As described below, other time sequences for sequential measurement of the resistance of the coil means 20 may also be made in the practice of applicant's invention herein.

FIGURE 3 illustrates a curve characteristic of operation of the embodiment of applicant's invention shown in FIGURE 1. As shown on FIGURE 3, there is illustrated the sequentially blocked times marked B, and unblocked times marked U, for the electromagnetic radiation 10 and the appropriate resistance readings made on the coil 20. In this embodiment of applicant's invention as shown on FIGURES 1 and 3, and with the chopper disc 28 as illustrated in FIGURE 2, measurements are sequentially made at the beginning and the end of each blocked period of each cycle. Thus, the resistance measurements indicated by the letter "$a$" are made at the beginning of each blocked cycle and the resistance measurements made as indicated by the letter "$b$" are made at the end of each blocked cycle. During the blocked cycle the electrical energy from the electrical energy source 46 is applied to the wire means 20.

The value $R_1$ as indicated on FIGURE 3 represents the steady state resistance value for no net radiation gain or loss from the black body cavity 16.

During the blocked portion 54 the first resistance measurement $a_1$ is made near the beginning of the power cycle and the synchronous switch 44 is synchronized with the blocked cycle to allow the application of the electrical energy to the coil means 20 and to the digital ratio voltmeter 50. After an appropriate predetermined time delay, a second measurement $b_1$ is made at the end of the blocked cycle which is equivalent to near the end of the power application from the electrical energy source 46. If the black body 12 was "cold" at the start of the measurements, it has a lower temperature than that which would be provided by the electromagnetic radiation 10. That is, the initial temperature of the black body 12 and the coil means 20 and the resistance of the coil means 20 therefor is less than the resistance that would be provided at steady state conditions as indicated by $R_1$.

During the first unblocked cycle 56, the temperature of the conical shell 14 increases since the radiation 10 applies energy thereto. At the beginning of the next blocked cycle 58 a measurement $a_2$ is made and this resistance reading as indicated at $a_2$ is greater than the resistance measurement made at the end of the previous blocked cycle $b_1$ and therefore additional energy is supplied from the electrical energy source 46 to the coil means 20 to heat the conical shell 14. At the end of the blocked cycle 58 the measurement $b_2$ is made of the resistance of the wire means 20. During the next unblocked cycle 60 since, as shown on FIGURE 3, the power applied during the blocked cycle 58 was sufficient to raise the temperature of the conical shell 14 to a value greater than that which would be achieved under steady state conditions from the incident electromagnetic radiation 10, there is a net heat loss by radiation from the conical shell 14 and consequently the temperature thereof and the resistance of the wire means 20 decreases during the unblocked cycle 60.

During the next blocked cycle 62, the first measurement $a_3$ is made at the commencement thereof and this measurement of resistance is less than the last measurement $b_2$ made at the end of the last blocked cycle 58. Therefore, the error signal applied to the electrical energy source 46 decreases the amount of energy that is applied to the wire means 20 and the measurement $b_3$ made at the end of the blocked cycle 62 is less than the resistance $a_3$ measured at the beginning of the blocked cycle 62 to indicate a slight heat loss from the conical shell 14. The curve between the points $a_3$ and $b_3$ is an exaggerated representation of the resistance reading and consequently the temperature of the conical shell 14, due to time response, thermal lag, and the like.

Since the resistance reading $b_3$ is still greater than the steady state value $R_1$ during the next unblocked cycle 64, there is an additional heat loss from the conical shell 14 and therefore a lower resistance reading. The resistance $a_4$ is measured at the beginning of the next blocked cycle 66 and this resistance reading $a_4$ is less than the resistance reading $b_3$ from the end of the previous blocked cycle 62 and, consequently, the magnitude of electrical energy supplied by electrical energy source 46 to the wire means 20 through the synchronous switch 44 as controlled by the error signal applied thereto is decreased and at the end of the blocked cycle 66 the reading $b_4$ indicates that there has been a temperature loss since the resistance reading at $b_4$ is less than the resistance at $a_4$. Also, as shown on FIGURE 3, the resistance $b_4$ has now dropped to a value below the steady state resistance $R_1$ there would be a change by the incident radiation 10, and consequently, during the next unblocked cycle 68, the incident radiation 10 heats the conical shell 14 and increases the temperature thereof and the temperature of the wire means 20.

In the next blocked cycle 70, the first resistance reading $a_5$ is higher than the resistance reading $b_4$ and is approximately the resistance $R_1$. Consequently, the error signal applied to the electrical energy source 46 appropriately controls the magnitude of the electrical energy signal.

From the above description of the operation of applicant's invention, as shown on FIGURE 1 and as illustrated graphically on FIGURE 3, it can be appreciated that the temperature of the conical shell 14 and consequently of the resistance coil wire 20 rapidly achieves a steady state value at the value $R_1$ wherein there is no net radiation gain or loss from the conical shell 14 and consequently it is in balance with the intensity of the electromagnetic radiation 10. Applicant achieves the generation of an error signal to control the magnitude of the electrical energy supplied by the electrical energy source 46 through the error signal generator 48 as shown on FIGURE 1.

As noted above, the digital ratio voltmeter 50 provides a signal having a magnitude proportional to the resistance of the wire means 20 and consequently a magnitude proportional to the temperature of the conical shell 14. This signal is fed into a time delayed digital switch 72 that sequentially transfers this information signal between a pair of storage registers 74 and 76. Thus, at the beginning of each cycle, a synchronous signal from photo electric cell 43 switches the digital switch 72 to apply the signal from voltmeter 50 to the storage register 76 and the magnitude of the signal is stored therein. The storage register 74 and 76 provide the memory necessary for achieving the control of the magnitude of the error signal generated in the error signal generator 48.

After an appropriate time delay, that is the delay between the time period between, for example, the points $a$ and $b$ in each blocked cycle, as indicated on FIGURE 3, the digital switch 72 switches to the storage register 74, upon receipt of a signal from photo electric cell 43, wherein the magnitude of the signal at the end of each blocked cycle is recorded. The synchronizing signal for control of the digital switch 72 as generated by the photo electric cell 43 may be caused, for example, by providing holes 39a and 39b in the disc 28 to correspond to the points $a$ and $b$ in each blocked cycle. Other hold pattern may be used to achieve any desired switching points.

The signals from the storage registers 74 and 76 are fed into a digital subtractor 78 which generates a signal having a magnitude proportional to the difference between the values in the storage register 74 and storage register 76 and a sign appropriate to which is larger.

FIGURE 7 illustrates an electrical energy source useful in the practice of the embodiment of applicant's invention shown in FIGURE 1. As shown on FIGURE 7, a pair of high gain DC operational amplifiers 100 and 102 are connected in series. Amplifier 100, together with register 104 and capacitor 106 act as an integrator for receipt of error signal and amplifier 102, together with registers 108 and 110, acts as an inverter. Diode 112 prevents backward voltage flow.

The above embodiment of applicant's invention, as illustrated in FIGURES 1 and 3, indicates that measurements of the temperature of the conical shell 14 are sequentially made at the beginning and the end of the blocked portion of the cycle of operation when the electrical energy from the electrical energy source 46 is being applied to the coil 20. These measurements are combined to provide an error signal that controls the magnitude of the electrical energy source so that the temperature of the conical shell 14 achieves an equilibrium condition with the incident radiation 10. When this condition is achieved, that is equilibrium, the amount of energy supplied to the coil 20 by the electrical energy source 46 during the blocked portion is exactly equal to the energy in the incident electromagnetic radiation 10. Therefore, measurements of this electrical energy will provide a measurement of the intensity of the incident electromagnetic radiation 10. The measurement of the electrical energy supplied by the electrical energy source 46 may conveniently be made, for example, by an ammeter 82 and a voltmeter 84 to provide an indication of the total electrical power cyclically applied to the coil 20 to provide the equilibrium condition. It will be appreciated that, of course, the precise value of the electrical power, that is the amperage and the voltage, are quite well known and are easily traceable to any standard. Further, if the incident radiation 10 is emitted from a black body source, then a precision temperature measurement is provided since the relationship between temperature and radiant energy in a black body is well known.

In the arrangement shown in FIGURES 1 and 3, the two sequential measurements of temperature are made at the beginning and end of the blocked cycle when the heating power is being supplied to the coil 20. It will be appreciated that other time periods may equally well be selected, for example, a temperature measurement may be made during the blocked cycle and during the unblocked cycle at known portions thereof and control of the error signal to control the magnitude the electrical energy supplied to the coil 20 can be provided. Since there is no heating power supplied to the coil 20 during the unblocked portions, in such an application a small, for example, microvolt, signal is applied to the coil so that the appropriate signal may be supplied to the digital ratio voltmeter 50. FIGURE 4 illustrates a block diagram of the controls necessary to provide such an arrangement and FIGURE 5 illustrates a graphical representation of the characteristics of such a system.

As shown on FIGURE 4, the control system comprises elements similar to that shown on FIGURE 1, that is, the electrical energy supplied to the black body cavity heater is also supplied to a digital ratio voltmeter 50 and a known resistance 52 so that a signal having a magnitude proportional to the resistance of the black body cavity heater coil 20 is provided to a digital switch 72. The digital switch 72 may, for example, have a built-in time delay equivalent to a time delay flip-flop so that measurements may be made as shown on FIGURE 5 during the middle of each blocked and unblocked cycle.

The storage registers 86 and 88 are part of an error signal generator 90 that receives the signal from the digital ratio voltmeter 50 and provides an error signal having a magnitude proportional the amount of energy that must be supplied to the black body heater coil 20 and a sign indicating whether the magnitude should be increased or decreased. Thus, the storage register 88 may be considered as measuring the resistance from the digital ratio voltmeter during the block portion of the cycle and the storage register 86 measures the resistance during the unblock portion of each cycle. The digital subtractor 78 subtracts these two resistances to provide a digital signal that is converted in a digital to analog converter 80 to the error signal having the magnitude proportional to the difference in the two resistances and a sign indicated whether to increase or decrease.

The error signal fed to the source of electrical energy 90 controls the magnitude thereof during the heating cycle. The synchronous switch 92 shown in FIGURE 4 switches between the high power setting which is provided to heat the black body cavity coil 20 during the blocked portion of each cycle and the low power, for example, a microvolt setting that is applied to the heater coil so that resistance measurements may be made thereof during the unblocked portion, The energy associated with the low power setting may be subtracted from the value obtained at thermal equilibrium of the black body cavity heater coil 20. Therefore, since the digital ratio voltmeter provides a signal having a magnitude proportional to the resistance, the absolute value of the voltage is immaterial and appropriate resistance readings may be made under either the high power or the low power settings. The synchronous switch 92 is controlled in a manner similar to that shown in FIGURE 1 for the synchronous switch 44 except that instead of "on-off" it switches from "high power" to "low power" upon the receipt of an appropriate synchronizing signal. That is, a low power DC source may be connected to the "off" terminal at the synchronous switch 44, as shown in FIGURE 7, to provide the low power to the coil 20 during the unblocked time periods. Similarly, appropriate hole patterns may be provided in the chopper disc utilized to control the digital switch 72. That is, holes 41a and 41b could be provided as shown on FIGURE 2 to correspond to the times $a$ and $b$ on FIGURE 5. In both the arrangements shown in FIGURE 1 and in FIGURE 4, the electrical energy source is preferably direct current since the magnitude of the power generated therein may be more easily computed in exact values and more easily controlled.

FIGURE 5 illustrates the cyclical blocked and unblocked time intervals for the arrangement shown in FIGURE 4 and the sequential resistance measurements. Similarly, as in the arrangement shown in FIGURE 1, the black body cavity is initially assumed to be of a temperature less than that provided by the incident electromagnetic radiation 10, that is the steady state resistance of the heater coil 20 as indicated by resistance $R_1$ on FIGURE 5 is greater than the initial value thereof when the incident electromagnetic radiation 10 first impinges upon the conical shell 14. The first reading during the first blocked portion 94 as indicated by $a_1$ is stored in the blocked resistance storage register 88. During the unblocked portion 96 following the blocked portion of the cycle 94, a resistance measurement $b_1$ is made under the low power setting provided by the electrical energy source through the synchronous switch 92 and this resistance is greater than that measured at $a_1$ since the heater wire 20 is still at a value less than the steady state condition $R_1$. This value is supplied to the unblocked resistance storage register 86 and an appropriate error signal proportional to the magnitude of the difference between the resistances $a_1$ and $b_1$ and having a sign indicating that the unblocked resistance $b_1$ is greater than $a_1$ is provided to control the electrical energy source 90 and proportionately increase the value of the electrical energy supplied to the heater coil 20. During the next blocked cycle 98, the reading $a_2$ made at the midpoint thereof is greater than the value provided by the measurement made at $b_1$ and consequently the error signal is provided to increase the electrical energy provided by electrical energy source 90. During the next unblocked portion 100, the reading $b_2$ thereof is greater than the resistance $a_2$, but has decreased from the peak provided by the measurement at $a_2$ and has decayed since the power supply during the blocked portion 98 increased the temperature of the heater wire 20 to a value greater than the steady state resistance value $R_1$. Consequently, the magnitude of the power to be supplied during the next blocked cycle 102 is decreased. The measurement $a_3$ made in the middle thereof is greater than the value provided by the measurement $b_2$ and the temperature increases slightly during the portion 102 of the cycle. During the next unblocked portion 104, the temperature decreases because the value of the resistance of the heater wire 20 was greater than the steady state value $R_1$ at the end of the blocked portion 102 and consequently the value of the resistance $b_3$ is less than the value $a_3$ and the magnitude of the error signal is proportional to the difference and the sign then indicates that the power should be decreased during the next blocked portion 106. Consequently, during the next block portion 106, less power than was applied during the previous blocked portion 102 is applied and the resistance measurement $a_4$ indicates the temperature has dropped and the value $a_4$ is less than the value $b_3$.

During the next unblocked portion 108, the value of the resistance measured at $b_4$ is greater than the value measured at $a_4$ and the appropriate control is provided in the error signal for controlling the amount of electrical energy supplied by the electrical energy source 90 during the heating cycle thereof.

Thus, applicant has indicated two arrangements for making sequential measurements during various power cycles of the absolute incident electromagnetic radiation energy measuring device described herein. It will be appreciated that those skilled in the art may make many variations and adaptations of applicant's invention without departing from the true scope and spirit of applicant's invention.

What is claimed as new and desired to be secured by Letters Patent of the United States is:

1. An absolute radiometer comprising, in combination:
   a black body cavity source for receiving incident radiant energy to be measured;
   means for cyclically interrupting impingement of said radiant energy to be measured upon said black body cavity;
   means for cyclically measuring the temperature of said cavity;
   means for cyclically applying predetermined amounts of other energy to heat said black body cavity in response to said cyclic measurements of the temperature of said cavity, and comprising:
   means for detecting the cyclically interrupted time periods when said radiant energy is not incident on said black cavity;
   means for generating an error signal, having a magnitude related to said measured temperature of said black body cavity;
   means for controlling the magnitude of said other energy applied to heat said black body cavity in response to the magnitude of said error signal; and
   means for applying said other energy to said cavity during said time periods when said radiant energy is interrupted from impingement on said cavity; and
   means for measuring said other energy.

2. The arrangement defined in claim 1 wherein said means for measuring the temperature of said black body cavity further comprises:
   means for generating a first information signal, having a magnitude proportional to the temperature of said black body cavity at a first time period;
   means for generating a second information signal, having a magnitude proportional to the temperature of said black body cavity at a second time interval; and
   said error signal having a magnitude proportional to the difference between said first and said second information signals.

3. The arrangement defined in claim 2 wherein said error signal controls the magnitude of said other energy applied to heat said black body cavity proportionally to said error signal to apply a first amount of other energy to said black body cavity for the condition of said first temperature signal equal to said second temperature signal, to provide a second amount of other energy greater than said first amount of other energy for the condition that said second temperature signal is greater than said first temperature signal, and applying a third amount of other energy less than said first amount of energy for the condition that said second temperature signal is less than said first temperature signal.

4. An absolute radiometer comprising, in combination:
   a black body cavity source for receiving incident radiant energy to be measured, said black body cavity comprising:
   a low thermal inertial mass having wall portions defining a conical cavity surface thereon; and
   means having a high radiant energy absorptivity coupled to said wall portions of said low thermal inertia mass for receiving and absorbing said radiant energy to be measured;

means for cyclically interrupting impingement of said radiant energy to be measured upon said black body cavity;

means for cyclically measuring the temperature of said cavity;

means for cyclically applying predetermined amounts of other energy to heat said black body cavity in response to said cyclic measurements of the temperature of said cavity, and said means for cyclically applying other energy comprising:

an electrically conductive wire means wound around external wall portions of said low thermal inertia mass, and said wire means having a predetermined relationship between the resistance thereof and the temperature thereof;

a source of other energy comprising a source of electrical energy coupled to said wire means for cyclically applying predetermined amounts of electrical energy to said wire means to heat said black body cavity;

electrical resistance measuring means coupled to said wire means for cyclically applying predetermined amounts of electrical energy to said wire means to heat said black body cavity;

electrical resistance measuring means coupled to said wire means for cyclically measuring the electrical resistance thereof to provide a cyclical measurement of the temperature of said black body cavity means; and means for measuring said other energy.

5. The arrangement defined in claim 4 wherein said means for cyclically interrupting the impingement of said radiant energy to be measured upon said black body cavity comprises:

a chopper disc having alternating sections of radiant energy transparent spaces and opaque spaces thereon;

motor means for rotating said chopper disc intermediate said radiant energy to be measured and said black body cavity to cyclically interrupt the impingement of said radiant energy upon said black body cavity;

means for generating a synchronizing signal for controlling said source of electrical energy to provide said electrical energy to heat said wire means for the condition of said radiant energy to be measured blocked from impingement on said black body cavity and preventing the transmission of electrical energy to heat said black body cavity for the condition of said radiant energy incident upon said black body cavity;

and said resistance measuring means further comprises:

resistance measuring means for measuring the resistance of said wire means to generate a first information signal having a magnitude proportional to the resistance thereof for the condition of said other energy first applied to said black body cavity and a second information signal having a magnitude proportional to the temperature of said black body cavity for the condition of said other energy before cyclical termination thereof;

and said means for cyclically applying other energy further comprises:

means for generating an error signal having a magnitude proportional to the difference between said first and said second temperature signals;

and means for applying said error signal to said source of electrical energy to control the magnitude of said electrical energy in response to the magnitude of said error signal.

6. The arrangement defined in claim 5 wherein said electrical energy supplied to said wire means is controlled to provide a first magnitude of electrical energy for the condition of said first temperature signal equal to said second temperature signal, applying a second amount of electrical energy greater than said first amount of electrical energy for the condition of said second temperature signal greater than said first temperature signal, and supplying a third amount of electrical energy greater than said first amount of electrical energy for the condition of said second temperature signal less than said first temperature signal.

7. A method for measuring the intensity of electromagnetic radiation energy comprising the steps of:

positioning a low thermal mass, high radiant energy absorbtivity black body cavity to receive said radiant energy;

cyclically interrupting the impingement of said radiant energy on said black body cavity;

sequentially and cyclically measuring the temperature of said black body cavity at a first and a second time interval;

generating an error signal having a magnitude proportional to the difference between the temperature of said black body cavity of said first and said second time interval;

applying other energy to heat said black body cavity during the time period that said radiant energy is blocked from impingement on said black body cavity;

controlling the magnitude of said other energy heating said black body cavity in response to the magnitude of said error signal; and measuring the amount of said energy supplied to heat said black body cavity.

References Cited

UNITED STATES PATENTS 3,039,006   6/1962   Weiss.
3,293,915  12/1966   Banca et al. _____ 73—355

ARCHIE R. BORCHELT, Primary Examiner

U.S. Cl. X.R.

73—355